(12) United States Patent
Hayashi et al.

(10) Patent No.: US 11,945,415 B2
(45) Date of Patent: Apr. 2, 2024

(54) VEHICLE-MOUNTED SENSOR CLEANING DEVICE

(71) Applicant: DENSO CORPORATION, Kariya (JP)

(72) Inventors: Yuji Hayashi, Kariya (JP); Kohei Toyama, Kariya (JP)

(73) Assignee: DENSO CORPORATION, Kariya (JP)

(*) Notice: Subject to any disclaimer, the term of this patent is extended or adjusted under 35 U.S.C. 154(b) by 142 days.

(21) Appl. No.: 17/030,820

(22) Filed: Sep. 24, 2020

(65) Prior Publication Data

US 2021/0009088 A1 Jan. 14, 2021

Related U.S. Application Data

(63) Continuation of application No. PCT/JP2018/036334, filed on Sep. 28, 2018.

(30) Foreign Application Priority Data

Mar. 28, 2018 (JP) .................. 2018-062749

(51) Int. Cl.
    B60S 1/56 (2006.01)
    B08B 3/02 (2006.01)
    (Continued)

(52) U.S. Cl.
    CPC .............. B60S 1/56 (2013.01); B08B 3/02 (2013.01); B08B 5/02 (2013.01); B08B 7/04 (2013.01);
    (Continued)

(58) Field of Classification Search
    CPC ................................. G02B 27/0006
    See application file for complete search history.

(56) References Cited

U.S. PATENT DOCUMENTS

2012/0117745 A1* 5/2012 Hattori .............. B60S 1/54
                                                 134/198
2013/0092758 A1* 4/2013 Tanaka .............. B60S 1/52
                                                 239/284.1
(Continued)

FOREIGN PATENT DOCUMENTS

EP  3 141 441 A1  3/2017
JP  S60-85262 U   6/1985
(Continued)

Primary Examiner — Spencer E. Bell
Assistant Examiner — Omair Chaudhri
(74) Attorney, Agent, or Firm — MASCHOFF BRENNAN

(57) ABSTRACT

A vehicle-mounted sensor cleaning device cleans a sensing surface of a vehicle-mounted sensor. The vehicle-mounted sensor cleaning device includes a gas nozzle spraying a gas toward the sensing surface, a gas supply device supplying the gas to the gas nozzle, and a control section controlling operation of the gas supply device. A predetermined value is set in the control section, for indicating an abnormal state of detection accuracy of the vehicle-mounted sensor based on detection accuracy information of an object which is obtained from the vehicle-mounted sensor. A gas supply threshold value is also set, for use in operating the gas supply device to direct a supply of the gas toward the sensing surface before the detection accuracy information becomes equal to or lower than the predetermined value. If the (Continued)

detection accuracy information has become lower than the gas supply threshold value, the control section operates the gas supply device.

9 Claims, 6 Drawing Sheets

(51) Int. Cl.
- *B08B 5/02* (2006.01)
- *B08B 7/04* (2006.01)
- *B08B 13/00* (2006.01)
- *B60Q 9/00* (2006.01)
- *B60S 1/48* (2006.01)
- *B60S 1/52* (2006.01)
- *B60S 1/54* (2006.01)
- *G01S 7/497* (2006.01)

(52) U.S. Cl.
CPC ............. *B08B 13/00* (2013.01); *B60Q 9/00* (2013.01); *B60S 1/481* (2013.01); *B60S 1/52* (2013.01); *B60S 1/54* (2013.01); *G01S 7/497* (2013.01); *G01S 2007/4977* (2013.01)

(56) References Cited

U.S. PATENT DOCUMENTS

| | | | |
|---|---|---|---|
| 2014/0270379 A1* | 9/2014 | Snider | B60R 1/00 382/104 |
| 2015/0203076 A1* | 7/2015 | Irie | G02B 27/0006 15/319 |
| 2015/0329083 A1* | 11/2015 | Kiyohara | B60S 1/485 348/148 |
| 2016/0272164 A1* | 9/2016 | Hsiao | B60S 1/485 |
| 2018/0143298 A1* | 5/2018 | Newman | G01C 21/3484 |
| 2018/0201231 A1* | 7/2018 | Tani | G02B 27/0006 |
| 2018/0265048 A1* | 9/2018 | Schmidt | B08B 5/02 |
| 2018/0370474 A1* | 12/2018 | Krishnan | B60H 3/06 |
| 2018/0370496 A1* | 12/2018 | Sykula | B60S 1/56 |
| 2019/0009752 A1* | 1/2019 | Rice | B60S 1/56 |
| 2019/0077377 A1* | 3/2019 | Schmidt | B60S 1/0848 |
| 2019/0084526 A1* | 3/2019 | Seubert | G06T 5/007 |
| 2019/0106085 A1* | 4/2019 | Bacchus | B60S 1/62 |
| 2019/0193688 A1* | 6/2019 | Lombrozo | B60S 1/54 |
| 2020/0057301 A1* | 2/2020 | Kuratani | G03B 17/08 |
| 2020/0391702 A1* | 12/2020 | Yamauchi | B60Q 9/00 |

FOREIGN PATENT DOCUMENTS

| | | |
|---|---|---|
| JP | H05-014961 U | 2/1993 |
| JP | H07-9661 U | 2/1995 |

\* cited by examiner

VEHICLE-MOUNTED SENSOR CLEANING DEVICE

CROSS-REFERENCE TO RELATED APPLICATION

The present application is based on and claims the benefit of priority from Japanese Patent Application No. 2018-062749 filed on Mar. 28, 2018, the description of which is incorporated herein by reference.

BACKGROUND

Technical Field

The present disclosure relates to a vehicle-mounted sensor cleaning device.

Related Art

Vehicle-mounted sensor cleaning devices that clean a sensing surface of a vehicle-mounted sensor, as a vehicle driving support device, are known.

SUMMARY

An aspect of the present disclosure is a vehicle-mounted sensor cleaning device that cleans a sensing surface of a vehicle-mounted sensor. The vehicle-mounted sensor cleaning device includes a gas nozzle that sprays a gas toward the sensing surface, a gas supply device that supplies the gas to the gas nozzle, and a control section that controls operation of the gas supply device. The control section has a predetermined value set, for indicating an abnormal state of detection accuracy of the vehicle-mounted sensor, based on detection accuracy information on an object which is obtained from the vehicle-mounted sensor, and has a gas supply threshold value set, which is used in operating the gas supply device to direct a supply of the gas toward the sensing surface before the detection accuracy information becomes equal to or lower than the predetermined value. If the detection accuracy information becomes lower than the gas supply threshold value, the control section operates the gas supply device.

DETAILED DESCRIPTION OF THE PREFERRED EMBODIMENTS

Vehicle-mounted sensor cleaning devices that clean a sensing surface of a vehicle-mounted sensor, as a vehicle driving support device, are known (see for example, JP-UM-A-5-14961, European Patent Publication No. 3141441, JP-UM-A-60-85262).

The vehicle-mounted sensor cleaning device of JP-UM-A-5-14961 has a wiper device, which cleans a sensing surface by wiping the surface. With the vehicle-mounted sensor cleaning device of European Patent Publication No. 3141441, a good cleaning performance is obtained by spraying a liquid onto an optical surface from a nozzle that is disposed facing a sensing surface, while the nozzle moves along the optical surface.

In the vehicle-mounted sensor cleaning device of JP-UM-A-60-85262, a spray nozzle is disposed close to a sensing surface but displaced from a position facing the sensing surface, and the sensing surface is cleaned by spraying air or washer liquid from the spray nozzle. Furthermore, in JP-UM-A-60-85262, a detection section is provided for detecting dirt on the sensing surface, and when it is judged that the sensing surface is dirty based on detection results of the detection section, air or washer liquid is sprayed from the spray nozzle to clean the sensing surface.

However, the vehicle-mounted sensor cleaning devices of JP-UM-A-5-14961 or European Patent Publication No. 3141441 above may become located at the front side of the sensing surface (positioned facing the sensing surface) and temporarily obstruct the sensing. With the vehicle-mounted sensor cleaning device of JP-UM-A-60-85262, since the cleaning nozzle is displaced from a position facing the sensing surface, obstruction of sensing is avoided.

Furthermore, in the vehicle-mounted sensor of JP-UM-A-60-85262, the detection section detects dirt on the sensing surface, and when it is judged that the sensing surface is dirty based on detection results from the detection section, air or a washer liquid is sprayed to clean the sensor. However, the degree of dirtiness is unclear, when judging whether to perform the cleaning operation by spraying air or by spraying the washer liquid. For that reason, it has been found that there is a problem whereby, if a cleaning operation is performed by using air or the like after the detection accuracy of sensing by the vehicle-mounted sensor has become significantly reduced, there is a danger that the condition of the sensing surface may be temporarily worsened, making sensing impossible (the sensor will not operate normally).

An object of the present disclosure is to provide a vehicle-mounted sensor cleaning device that maintains a sensing surface in a suitable condition.

An embodiment of the vehicle-mounted sensor cleaning device will be described in the following.

Figure 1:
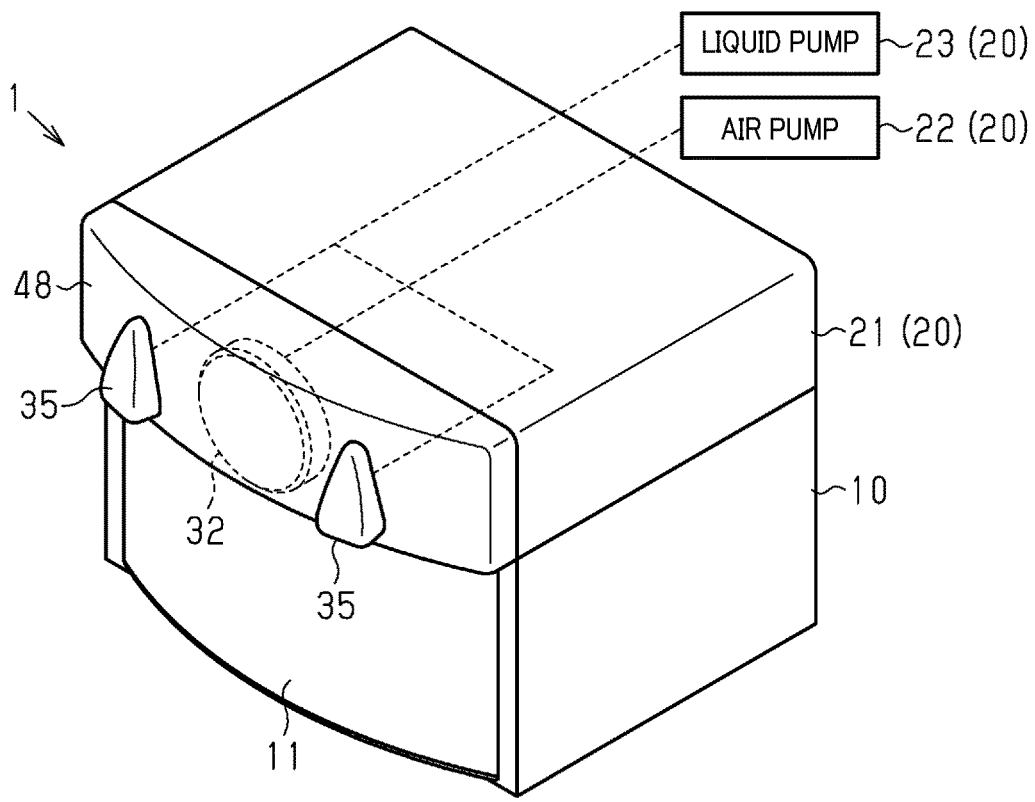
FIG. 1 is a perspective view of a sensor system that incorporates a vehicle-mounted sensor cleaning device according to an embodiment.

As shown in FIG. 1, a sensor system 1 according to the present embodiment has a vehicle-mounted sensor 10 and a vehicle-mounted sensor cleaning device 20 as vehicle-mounted sensors, with the vehicle-mounted sensor cleaning device 20 stacked on the vehicle-mounted sensor 10. The vehicle-mounted sensor cleaning device 20 cleans an optical surface 11, which is a sensing surface of the vehicle-mounted sensor 10.

The vehicle-mounted sensor 10 is, for example, a device (such as a LIDAR) which emits light from an infrared laser and receives scattered light reflected from objects, for measuring the distances to the objects. The vehicle-mounted sensor 10 has the optical surface 11 that is transparent to the laser light. The vehicle-mounted sensor 10 can output, to an external device, information expressing the distance to an object, measured using, for example, the infrared laser, for use by an automatic braking system or the like. That is, the vehicle-mounted sensor 10 is a sensor which the user (vehicle occupant) does not need to visually recognize. In the following description, the side facing the optical surface 11 will be referred to as the front and the opposite side will be referred to as the rear. Furthermore, unless otherwise specified, the stacking direction of the vehicle-mounted sensor cleaning device 20 with respect to the vehicle-mounted sensor 10 will be referred to as the vertical direction, and the direction orthogonal to the vertical direction and to the front-rear direction will be referred to as the left-right direction.

The optical surface 11 of the vehicle-mounted sensor 10 is convex toward the front, and has a curved shape when viewed from above and from below.

As shown in FIG. 1, the vehicle-mounted sensor cleaning device 20 includes a nozzle unit 21 that is stacked on the vehicle-mounted sensor 10 (upward in the vertical direction), an air pump (gas supply device) 22 that supplies air to the nozzle unit 21, and a liquid pump (liquid supply device) 23 that supplies liquid to the nozzle unit 21.

Figure 3:
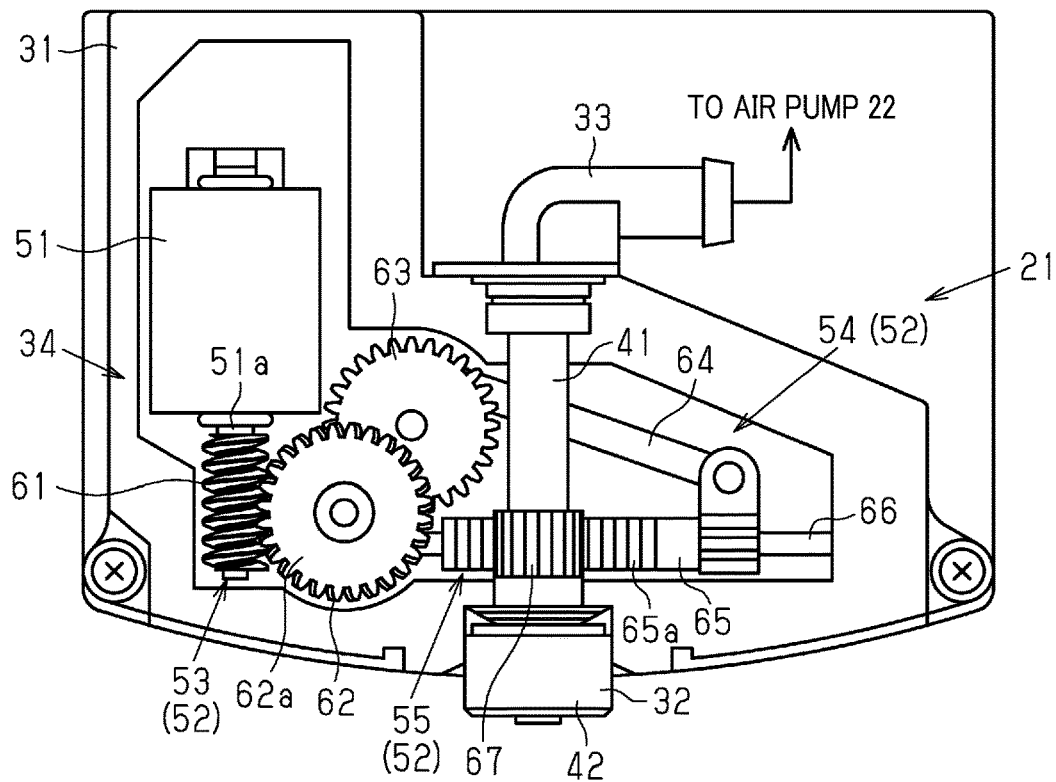
FIG. 3 is a plan view of the vehicle-mounted sensor cleaning device of FIG. 1.
Figure 4:
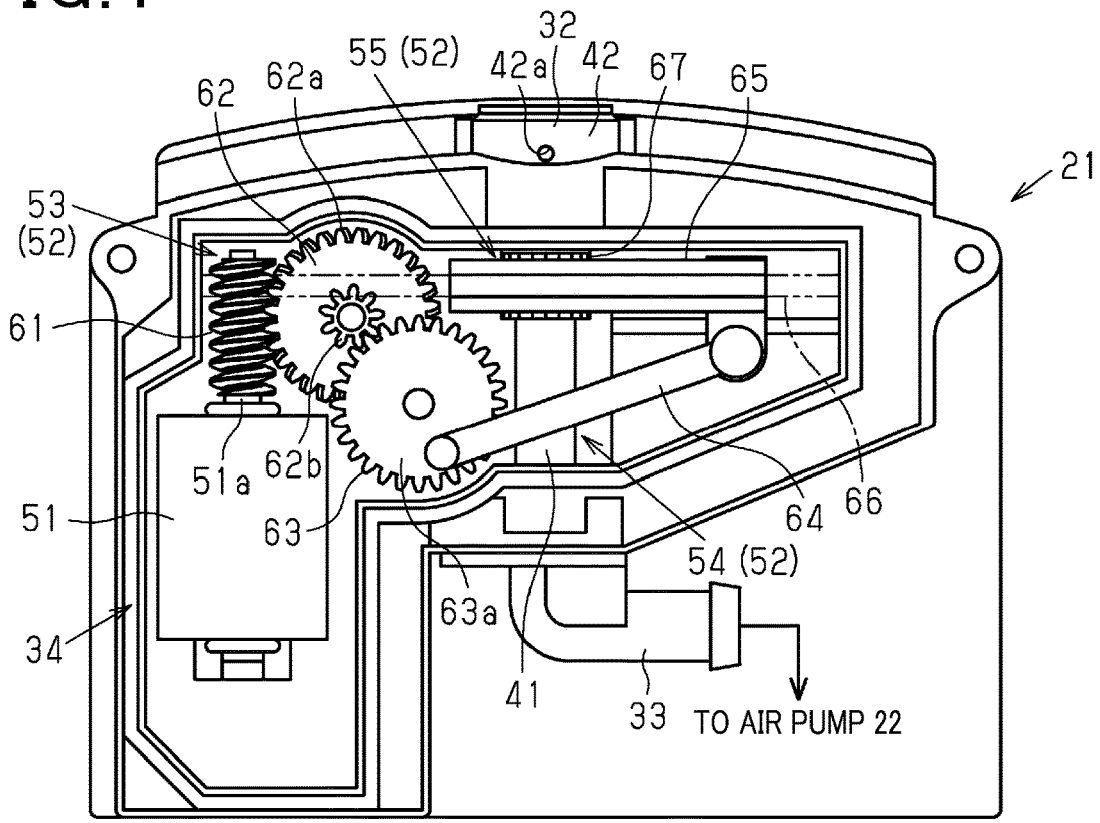
FIG. 4 is a plan view of the vehicle-mounted sensor cleaning device of FIG. 1.

As shown in FIGS. 3 and 4, the nozzle unit 21 includes a housing 31, a gas nozzle 32 disposed such that at least a part of the gas nozzle 32 projects forward (exposed) from the housing 31, a connection portion 33 disposed between the gas nozzle 32 and the air pump 22, a drive section 34 that is housed in the housing 31, and liquid nozzles 35.

As shown in FIGS. 3 and 4, the connecting portion 33 is disposed slightly to the rear of the center of the nozzle section 21 and is connected to the air pump 22 via, for example, a hose pipe (not shown in the drawing), and air supplied from the air pump 22 can be introduced into a flow path formed in the connecting portion 33.

Figure 2:
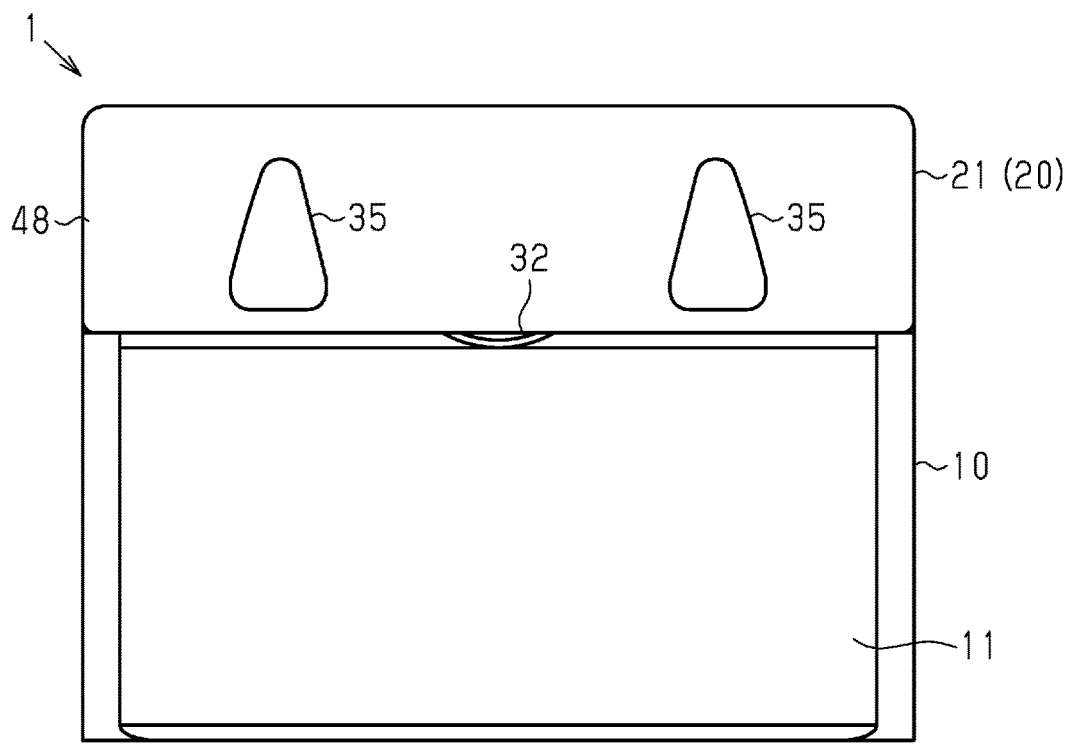
FIG. 2 is a frontal view of the sensor system of FIG. 1.

As shown in FIGS. 1 and 2, the gas nozzle 32 is disposed at a substantially central position with respect to the left-right direction.

As shown in FIGS. 2 and 3, the gas nozzle 32 includes a cylindrical portion 41 extending in the front-rear direction, and a disk shaped (columnar) main body portion 42 disposed at the front of the cylindrical portion 41 and having a larger diameter than the cylindrical portion 41. The cylindrical portion 41 of the gas nozzle 32 is disposed in front of the connecting portion 33 and is rotatably supported. The main body portion 42 is integral with the cylindrical portion 41, and is rotatably supported. The main body portion 42 has a spray port 42a from which air (gas) supplied from the air pump 22 can be sprayed.

As shown in FIGS. 1 and 2, the entire gas nozzle 32 is located above the vehicle-mounted sensor 10 (optical surface 11). The gas nozzle 32 is thus prevented from facing the optical surface 11. In addition, a flow path (not shown) is provided in the gas nozzle 32, formed to pass through the cylindrical portion 41 and the main body portion 42. A flow path (not shown) formed in the connection portion 33 communicates with the flow path of the gas nozzle 32 at the position where the rear part of the cylindrical portion 41 faces the front of the connecting portion 33. Hence the gas (air) that is supplied from the air pump 22 passes through the flow path in the connecting portion 33 and the flow path in the gas nozzle 32, to be sprayed from the spray port 42a of the main body portion 42 of the gas nozzle 32. The flow path of the gas nozzle 32 is made substantially L-shaped by means of a bend within the main body portion 42, formed such that the spray port 42a (the spray axis line SL) faces vertically downward. A seal is formed between the rear end part of the cylindrical portion 41 and the connecting portion 33, to prevent water or the like from entering the inside from between the connecting portion 33 and the cylindrical portion 41.

As shown in FIG. 1, a nozzle cover 48 is provided in front of the gas nozzle 32, which covers the gas nozzle 32 and shields it from exposure to the exterior. The nozzle cover 48 is attached to the housing 31 with screws, for example. However, the nozzle cover 48 may be attached by other methods, such as snap fitting.

As shown in FIGS. 3 and 4, the drive section 34 within the housing 31 includes a motor 51 and a drive force transmission mechanism 52 that transmits drive force of the motor 51.

The drive force transmission mechanism 52 has a speed reduction section 53, a first motion conversion section 54, and a second motion conversion section 55.

The speed reduction section 53 has a worm 61 and a first gear 62. The worm 61 is formed on an output shaft 51a of the motor 51 and meshes with a worm wheel 62a of the first gear 62. The first gear 62 is integrally formed with the worm wheel 62a and rotates coaxially with the worm wheel 62a as a unit, and has a spur gear 62b which is of smaller diameter than the worm wheel 62a and which meshes with a second gear 63 of the first motion conversion section 54.

As shown in FIGS. 3 and 4, the first motion conversion section 54 is what is known as a reciprocating slider/crank mechanism that converts circular motion (rotational motion) into reciprocating linear motion, and includes the second gear 63, a columnar rod member 64 having one end thereof connected to the second gear 63, and a slider member 65 connected to the other end of the rod member 64. The second gear 63 is a spur gear. One end of the rod member 64 that constitutes the first motion conversion section 54 is connected to an axial end surface 63a of the second gear 63, at a position separated from the rotation center of the second gear 63. That is, the second gear 63 functions as a crank of the reciprocating slider/crank mechanism. The other end of the rod member 64 is connected to one end of the slider member 65. The slider member 65 is supported by a linear guide member 66 which extends in the left-right direction, and is capable of linear reciprocating motion along the guide member 66.

In the first motion conversion section 54 configured as described above, when the second gear 63 is driven for rotation, a drive force is transmitted to the slider member 65 via the rod member 64. The slider member 65 is caused to perform linear reciprocating motion in the left-right direction along the guide member 66 by the transmitted drive force.

When the circular motion (rotational motion) is converted to reciprocating linear motion as described above, with the second gear 63 rotated at a constant speed, the speed of the converted slider member 65 varies in a similar way to a sine wave (cosine wave).

The second motion conversion section 55 converts reciprocating linear motion into circular motion, by using a rack and pinion in this example. More specifically, the second motion conversion section 55 has the slider member 65 and a pinion gear section 67. Here, the slider member 65 corresponds to a rack, and the pinion gear portion 67 corresponds to a pinion. That is, the slider member 65 constitutes both the first motion conversion section 54 and the second motion conversion section 55 (forms part of both).

A toothed portion 65a is formed on the surface of the slider member 65. The toothed portion 65a meshes with the pinion gear portion 67 formed on the outer peripheral surface of the cylindrical portion 41 of the gas nozzle 32. That is, when the slider member 65 reciprocates linearly, the pinion gear portion 67 rotates and the gas nozzle 32 rotates. Since the slider member 65 reciprocates linearly, when the slider member 65 moves forward, the pinion gear portion 67 and the gas nozzle 32 rotate in one direction, and when the slider member 65 moves backward, the pinion gear portion 67 and the gas nozzle 32 rotate in the opposite direction. In that way, the gas nozzle 32 rotates such as to vary the direction of its spray port 42a within a predetermined range that covers all of the optical surface 11.

As shown in FIGS. 1 and 2, one liquid nozzle 35 is provided on each side of the gas nozzle 32 in the left-right direction. Each liquid nozzle 35 differs from the gas nozzle 32 in that it cannot rotate (swing). Each liquid nozzle 35 has a spray port 35a and is connected to the liquid pump 23, which is different from the air pump 22, for spraying liquid from the spray port 35a. The liquid supplied from the liquid pump 23 may be, for example, a washer liquid used for cleaning the windshield, etc., of the vehicle.

Figure 5:
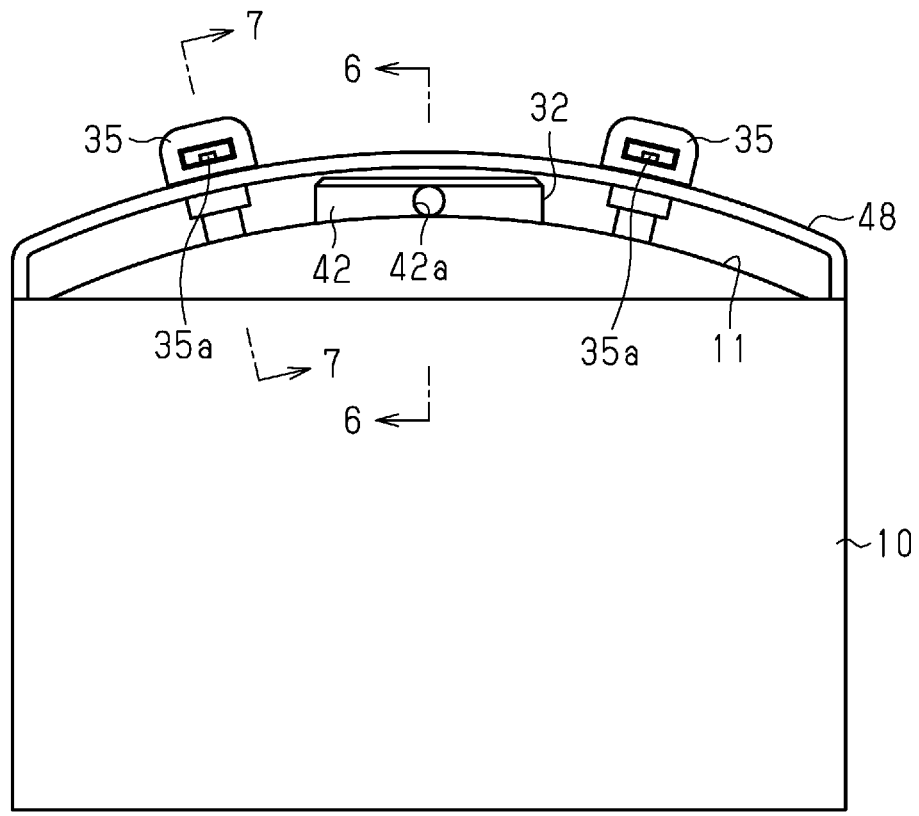
FIG. 5 is a plan view of the sensor system of FIG. 1.
Figure 6:
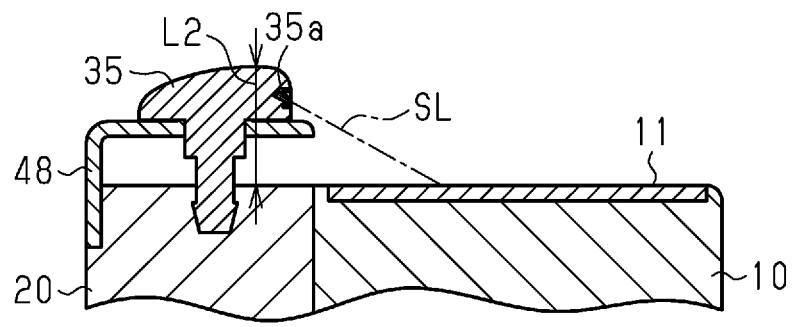
FIG. 6 is a cross-sectional view taken along line 6-6 in FIG. 5.
Figure 7:
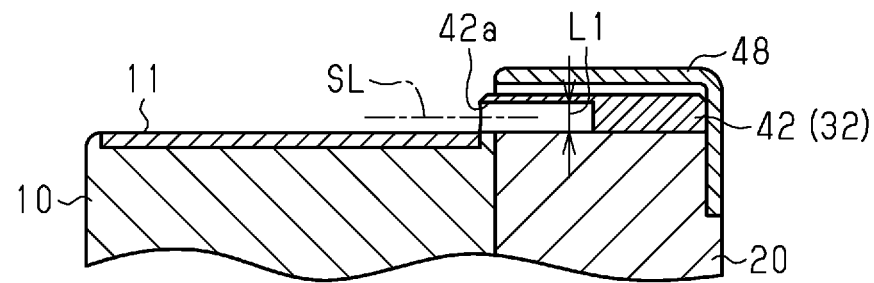
FIG. 7 is a cross-sectional view taken along line 7-7 in FIG. 6.

As shown in FIGS. 5 to 7, each liquid nozzle 35 is configured such as to project forward from the nozzle cover 48 and be exposed to the exterior. The amount L2 by which the liquid nozzles 35 protrude from the optical surface 11 in the plane orthogonal direction is greater than the amount L1 by which the gas nozzle 32 protrudes from the optical surface 11 in the plane orthogonal direction. In other words, the amount L1 by which the gas nozzle 32 protrudes from the optical surface 11 in the plane orthogonal direction is less than the amount L2 by which the liquid nozzles 35 protrude from the optical surface 11 in the plane orthogonal direction.

As a result, as shown in FIGS. 6 and 7, a spray axis SL of each gas nozzle 32 is made substantially parallel to the optical surface 11 and inclined at a predetermined angle with respect to the optical surface 11.

Figure 8:
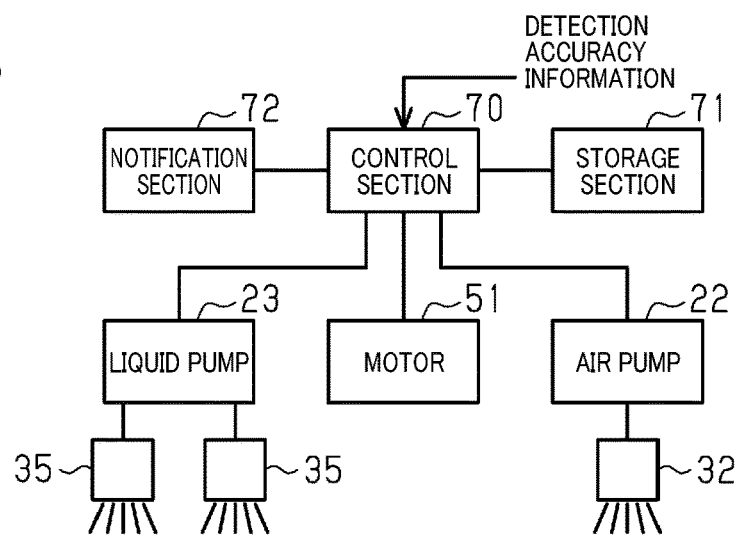
FIG. 8 is a block diagram of the vehicle-mounted sensor cleaning device.

As shown in FIG. 8, the vehicle-mounted sensor cleaning device 20 of the present embodiment includes a control section 70, a storage section 71, and a notification section 72. The notification section 72 notifies the user when objects cannot be appropriately detected, for example, by audible or displayed notification. The control section 70 is electrically connected to the air pump 22, the liquid pump 23, the motor 51, and the notification section 72, and controls each of these. Detection accuracy information on objects, obtained from the vehicle-mounted sensor 10, is inputted to the control section 70. The control section 70 of this example is configured to compare the inputted detection accuracy information with threshold values HH, HL, and L that have been stored beforehand in the storage section 71, and to select appropriate one of a plurality of modes based on the comparison result.

A control flow of the vehicle-mounted sensor cleaning device 20 of the present embodiment will next be described.

Figure 14:
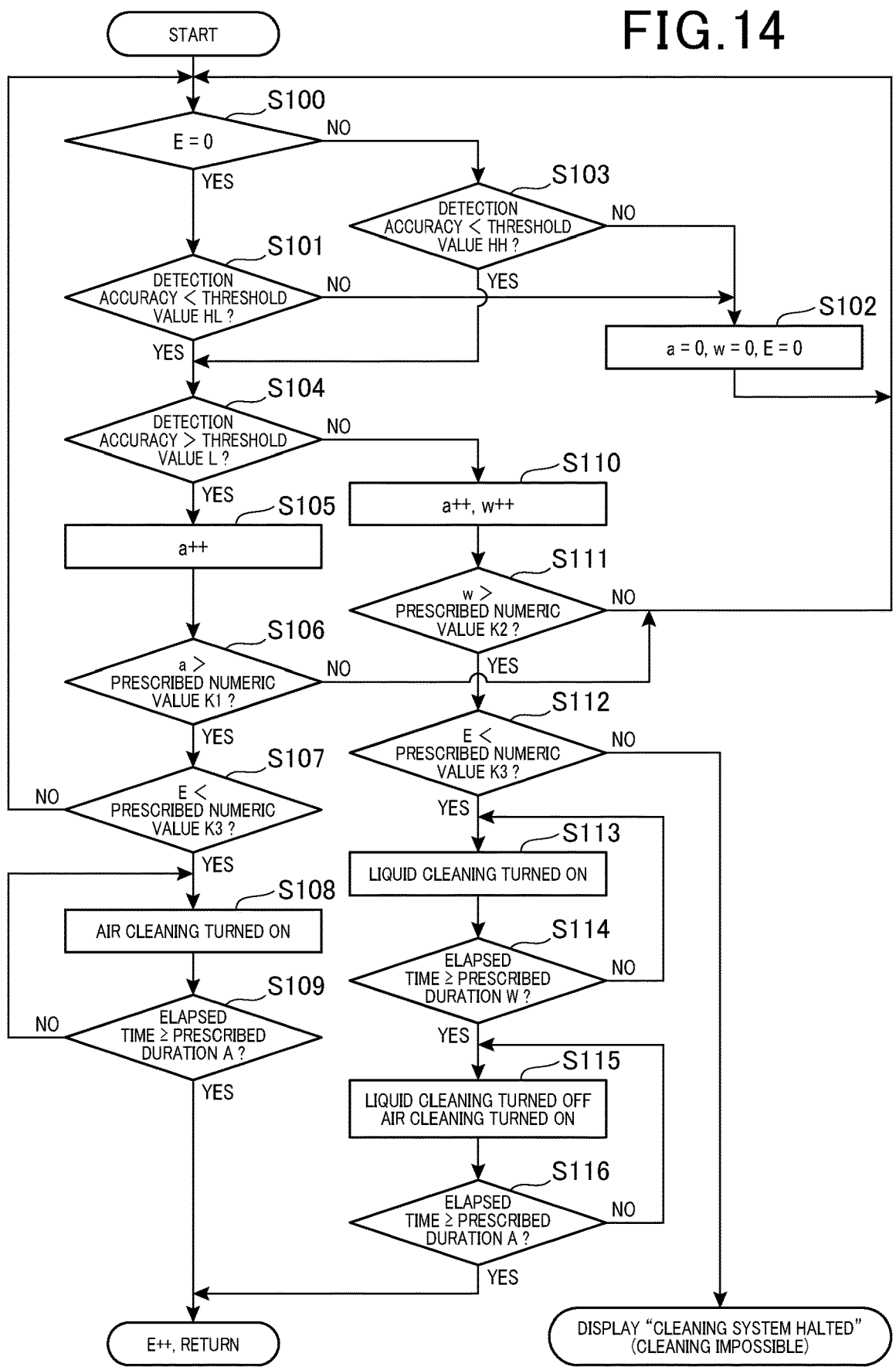
FIG. 14 is a flow diagram for describing an example of control of the vehicle-mounted sensor cleaning device.

As shown in FIG. 14, the control section 70 judges whether the value of a variable E is 0 (step S100). The variable E is a cleaning completion flag, and in the case of this example, if the value of the flag is other than 0 it is judged that the cleaning has been completed.

If the value of the variable E is 0 (step S100: YES), the control section 70 judges whether the detection accuracy information is lower than a threshold value HL (step S101).

If the detection accuracy information is not lower than the threshold value HL (step S101: NO), the control section 70 sets each of respective variables a, w, and E to 0 (step S102), and repeats the processing from step S100.

If the variable E is not 0 (step S100: NO), the control section 70 judges whether the detection accuracy information is lower than a threshold value HH. (Step S103).

If the detection accuracy information is not lower than the threshold value HH (step S103: NO), the control section 70 sets each of the variables a, w, and E to 0 (step S102), and repeats the processing from step S100.

If the detection accuracy information is lower than the threshold value HL (step S101: YES) or is lower than the threshold value HH (step S103: YES), the control section 70 judges whether the detection accuracy information is higher than a threshold value L (step S104).

If the detection accuracy information is higher than the threshold value L (step S104: YES), the control section 70 increments the variable a (step S105). The variable a is a count value for counting the number of times that the detection accuracy information becomes lower than the threshold value HL.

Next, the control section 70 judges whether the variable a is higher than a prescribed numeric value K1 (step 106). The prescribed numeric value K1 is an arbitrary value which determines a condition for the variable a. If the variable a exceeds the prescribed numeric value K1, execution of steps S107 to S109 described below is halted. That is, the duration of the period for which the detection accuracy information is lower than the threshold value HL can be measured.

If the value of the variable a is not higher than the prescribed numeric value K1 (step S106: NO), the control section 70 repeats the processing from step S100.

If the value of the variable a is higher than the prescribed numeric value K1 (step S106: YES), the control section 70 judges whether the variable E is lower than a prescribed numeric value K3 (step S107). The prescribed numeric value K3 is an arbitrary value which determines a condition of the variable E.

If the variable E is not lower than the prescribed numeric value K3 (step S107: NO), the control section 70 repeats the processing from step S100. As a result, a stop hold operation is executed, in which cleaning is not performed. Here, the variable E is incremented each time a cleaning operation is performed in step S108 or step S115, described hereinafter. As the number of cleaning operations increases, the value of the variable E increases until it becomes equal to or higher than the prescribed numeric value K3, and the processing from step S100 described above is then repeatedly performed, implementing the stop hold operation.

If the value of the variable E is lower than the prescribed numeric value K3 (step S107: YES) the control section 70 turns on air cleaning to drive the air pump 22 and the motor 51, to rotate the gas nozzle 32 while spraying air from the nozzle (step S108).

So long as the elapsed time from the first execution of step S108 continues to be lower than a specified duration A (step S109: NO), the control section 70 maintains the on state of the air cleaning in the executions of step S108. That is, the condition in which air is sprayed from the gas nozzle 32 while the gas nozzle 32 rotates is continued.

When the elapsed time from the first execution of step S108 reaches the specified duration A or longer (step S109: YES), the control section 70 halts the air pump 22 and the motor 51, increments the variable E, and repeats the processing from step S100.

If the detection accuracy information is not above the threshold value L (step S104: NO), the control section 70 increments each of the variables a and w (step S110). Here, the variable w is a count value for counting the number of times that the detection accuracy information is judged to be lower than the threshold value L.

Next, the control section 70 judges whether the variable w is higher than the prescribed numeric value K2 (step 111). The prescribed numeric value K1 is an arbitrary value that determines the condition for the variable a. The execution of steps S112 to S115, described hereinafter, is halted until the value of the variable w exceeds the prescribed numeric value K2. That is, the period for which the value is lower than the threshold L can be measured.

If the variable w is not higher than the prescribed numeric value K2 (step S111: NO), the control section 70 repeats the processing from step S100.

If the variable w is higher than the prescribed numeric value K2 (step S111: YES), the control section 70 judges whether the variable E is lower than the prescribed number K3 (step S112).

If the variable E is lower than the prescribed numeric value K3 (step S112: YES), the control section 70 turns on liquid cleaning to drive the liquid pump 23 to spray liquid (washer liquid) from the two liquid nozzles 35 (step S113).

The control section 70 maintains the on state of the liquid cleaning in executions of step S113 so long as the elapsed time from the first execution of step S113 is lower than a specified duration W (step S114: NO). That is, the state in which liquid is sprayed from the two liquid nozzles 35 is continued.

When the elapsed time from the first execution of step S113 is the specified duration W or more (step S114: YES), the control section 70 turns off the liquid cleaning to stop the liquid pump 23, and turns on the air cleaning to drive the air pump 22 and the motor 51, to rotate the gas nozzle 32 while air is being sprayed from the gas nozzle 32 (step S115).

The control section 70 maintains the on state of the air cleaning that results from executing step S114, so long as the elapsed time from the first execution of step S115 is lower than a specified time A (step S116: NO). That is, the state of spraying air from the gas nozzle 32 while rotating the gas nozzle 32 is continued.

When the elapsed time from the first execution of step S115 reaches the specified time A or more (step S116: YES), the control section 70 halts the air pump 22 and the motor 51, increments the variable E, then repeats the processing from step S100.

If the variable E is not lower than the prescribed numeric value K3 (step S112: NO), the control section 70 halts the air pump 22, the liquid pump 23, and the motor 51, and issues a notification from the notification section 72 that cleaning cannot be performed.

The control section 70 controls the air pump 22, the liquid pump 23, the motor 51 and the notification section 72 in accordance with the control flow described above.

Figure 9:
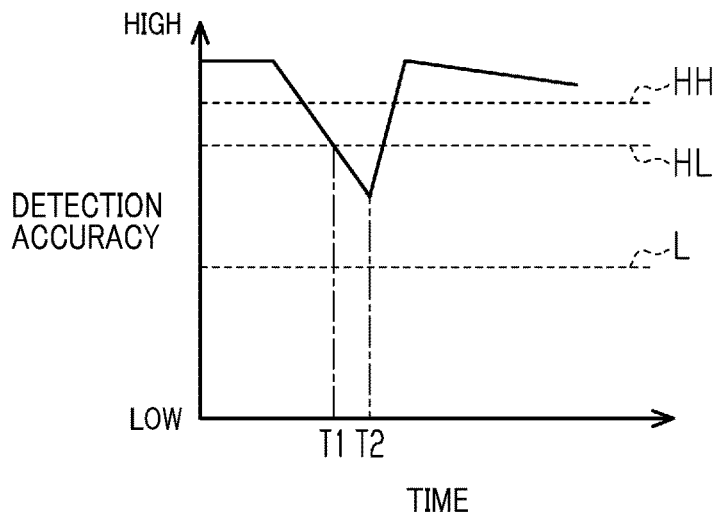
FIG. 9 is a graph for describing an example of control of the vehicle-mounted sensor cleaning device.

For example, as shown in FIG. 9, if the value of the variable E is 0, that is, in the unwashed state, when a predetermined period (timing T2-timing T1) has elapsed during which the detection accuracy is lower than the threshold HL and higher than the threshold L, the control section 70 drives the air pump 22 and the motor 51 to rotate the gas nozzle 32 and spray air from the gas nozzle 32. In the example shown in FIG. 9, air spraying, that is, air cleaning, is performed when the detection accuracy becomes equal to or higher than the threshold value H L.

Figure 11:
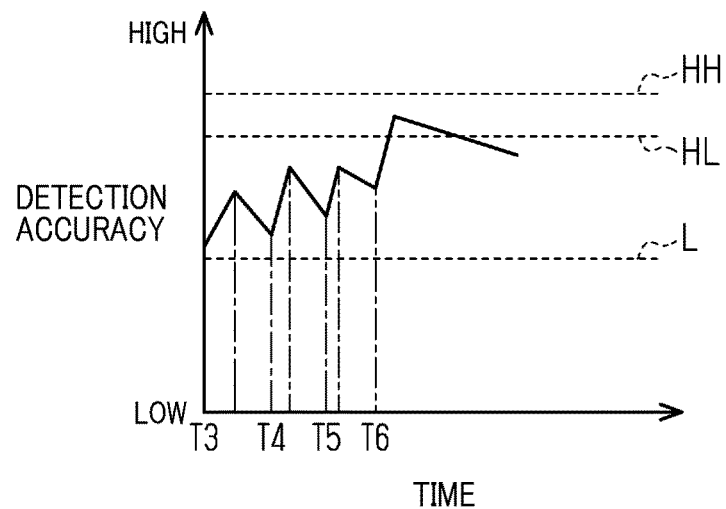
FIG. 11 is a graph for describing an example of control of the vehicle-mounted sensor cleaning device.

As shown in FIG. 11, when the value of the variable E is not 0, that is, in a state in which the cleaning has been performed one or more times, if the detection accuracy has continued to be lower than the threshold value HL and higher than the threshold value L, the control section 70 repeatedly performs (continues to perform) air cleaning until the detection accuracy becomes equal to or higher than the threshold value HL. More specifically, in the control flow described above, the air cleaning is repeatedly performed until the variable E becomes the prescribed numeric value K3 or more. When the variable E becomes equal to or more than the prescribed numeric value K3, the cleaning operations are halted and the stop hold state is entered. It should be noted that, in FIG. 11, the threshold value HL or more is reached by performing the air cleaning four times, at the timings T3, T4, T5, and T6.

Figure 12:
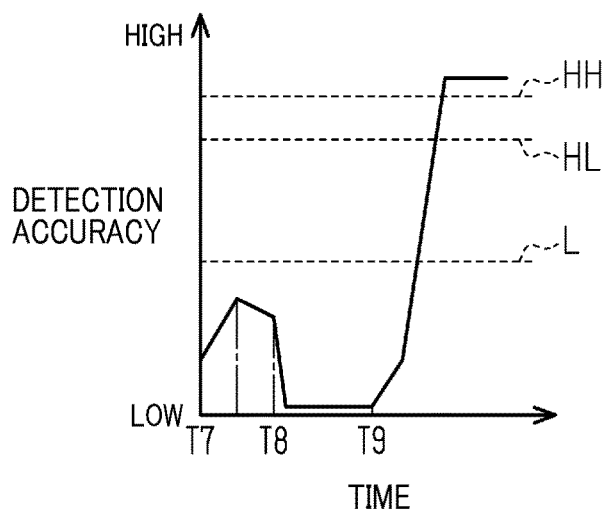
FIG. 12 is a graph for describing an example of control of the vehicle-mounted sensor cleaning device.

Furthermore, as shown in FIG. 12, if the detection accuracy has remained lower than the threshold value L after the air cleaning has been executed at the timing T7, the control section 70 performs liquid cleaning at the timing T8, by driving the liquid pump 23 to spray liquid (washer liquid) from the two liquid nozzles 35. Next, the control section 70 performs air cleaning at the timing T9, to remove liquid adhering to the optical surface 11.

Figure 13:
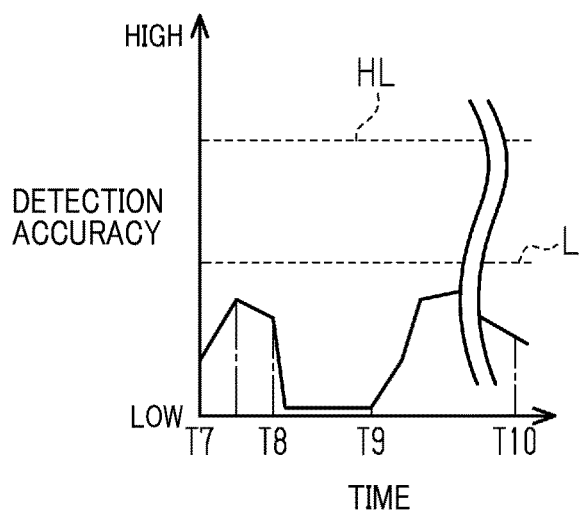
FIG. 13 is a graph for describing an example of control of the vehicle-mounted sensor cleaning device.

Furthermore, as shown in FIG. 13, if the detection accuracy remains lower than the threshold value L even after the cleaning operations have been performed a plurality of times, then at the timing T10, the control section 70 causes the notification section 72 to issue a notification, and halts the air pump 22, the liquid pump 23, and the motor 51.

DESCRIPTION OF ADVANTAGEOUS EFFECTS OF THE PRESENT EMBODIMENT (1) The control section 70 is provided with a threshold value L for use in indicating that the detection accuracy of the vehicle-mounted sensor 10 is in an abnormal state, based on the detection accuracy information, and is provided with a threshold value HL as a gas supply threshold value, for use in operating the air pump 22 before the detection accuracy information becomes equal to or lower than the threshold value L. When the detection accuracy information becomes lower than the threshold value HL, the air pump 22 is operated and air (gas) is sprayed from the gas nozzle 32 toward the optical surface 11. In that way, the state of the optical surface 11 can be maintained in a suitable condition by operating the air pump 22 to spray gas toward the optical surface 11 before an abnormal state occurs. In addition, in many cases, after the detection accuracy has become abnormal, dirt does not become removed naturally and is difficult to remove. By spraying air (gas) before the detection accuracy has become abnormal, dirt can be readily removed, and as a result, the air pump 22 which constitutes a gas supply device can be small in size.

(2) By using a configuration which sprays air, it is possible to eliminate the need for a large mechanism such as a wiper mechanism, and to reduce the consumption of consumables such as washer liquid.

(3) By halting the operation of the air pump 22 when the detection accuracy information changes from being lower than the threshold value HL to being equal to or higher than the threshold value HL, unnecessary power consumption can be suppressed.

(4) The optical surface 11 can be maintained in a suitable state by continuing the operation of the air pump 22 until the threshold value HL or more of the detection accuracy information is reached.

(5) If the detection accuracy information becomes equal to or lower than the threshold value L, the air pump 22 is operated for a predetermined time period, and if the detection accuracy information does not become higher than the threshold value L after the air pump 22 has been operated for the predetermined time period, the liquid pump 23 is operated, to spray liquid from the liquid nozzles 35 toward the optical surface 11. By performing cleaning of the optical surface 11 by means of a liquid after the optical surface 11 has been cleaned with a gas, the optical surface 11 can be maintained in a suitable condition. Furthermore, although the detection accuracy is temporarily reduced by the spraying of the liquid, since the mass of the liquid is higher than that of a gas, foreign matter that is on the sensing surface constituted by the optical surface 11 can be effectively removed, enabling the detection accuracy to be quickly restored.

(6) After operating the liquid pump 23, the control section 70 operates the air pump 22 to spray air after spraying a liquid, thereby preventing the liquid from remaining on the optical surface 11. Obstruction of sensing by the vehicle-mounted sensor 10, due to presence of the liquid, can thereby be prevented.

(7) By repeatedly operating the air pump 22 and the liquid pump 23 a predetermined number of times, the control section 70 can remove foreign matter adhering to the optical surface 11 and maintain the optical surface 11 in a suitable condition.

(8) A notification section 72 is provided, and if the detection accuracy information does not become higher than the threshold value L even after the air pump 22 and the liquid pump 23 have each been repeatedly operated a predetermined number of times, the notification section 72 issues a notification to inform the user that objects cannot be detected properly. Furthermore, unnecessary power consumption is suppressed by halting operation of the air pump 22 and the liquid pump 23.

The above embodiment may be modified as follows.

Figure 10:
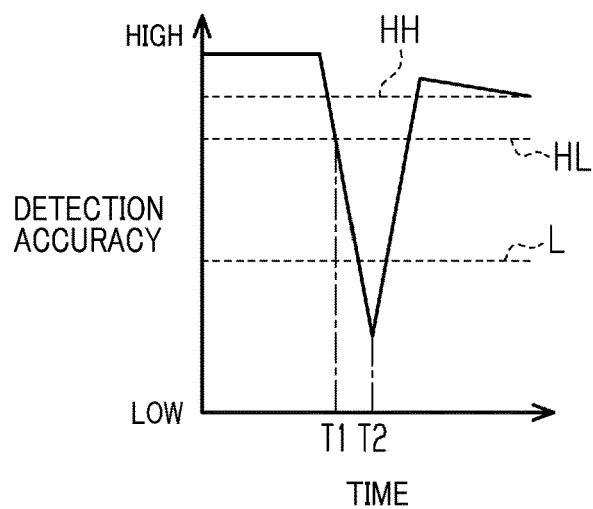
FIG. 10 is a graph for describing an example of control of the vehicle-mounted sensor cleaning device.

The above embodiment does not mention an operation example for the case of the uncleaned state (when the variable E is 0) in which neither air cleaning nor liquid cleaning has been performed, and in which the detection accuracy information value is lower than the threshold value L. For example, the control section 70 may perform air cleaning as shown in FIG. 10.

In the above-described embodiment, the air pump 22 is operated for a predetermined time period if the detection accuracy information becomes equal to or lower than the threshold value L, and if the detection accuracy information does not become higher than the threshold value L even after the air pump 22 has been operated for the predetermined time period, the liquid pump 23 is then operated to spray liquid from the liquid nozzle 35 toward the optical surface 11. However, the present disclosure is not limited to this. For example, the output (for example, voltage) of the air pump 22 constituting the gas supply device may be increased stepwise, with spraying of the liquid being performed if the detection accuracy (detection accuracy information) still does not recover.

In the above embodiment, two liquid nozzles 35 are provided, however, a configuration may be adopted having a single liquid nozzle, or having three or more liquid nozzles.

In the above embodiment, a single gas nozzle 32 is provided, however, a plurality of gas nozzles 32 may be provided.

In the above embodiment, as an example, the liquid nozzle 35 sprays washer liquid as the liquid and the gas nozzles 32 spray air as the gas. However, the present disclosure is not limited to this, and another gas may be used instead of air.

In the above-described embodiment, the gas nozzles 32 are configured to rotate (swing). However, so long as they are displaced (shifted) from positions facing the optical surface 11 and air (gas) can be sprayed to required positions on the optical surface 11, an aspect other than rotation may be used.

In the above embodiment, the vehicle-mounted sensor cleaning device 20 is provided with the notification section 72. However, a configuration in which the notification section 72 is omitted may be adopted. If the notification section 72 is omitted from the vehicle-mounted sensor cleaning device 20, a configuration may be adopted in which a signal is outputted to a vehicle audio system or vehicle navigation system installed on the vehicle, for causing notifications to be issued from a loudspeaker, display device, or the like, which is connected to the vehicle audio system or vehicle navigation system.

In the above embodiment, a Lidar is used as the vehicle-mounted sensor 10. However, the present disclosure is not limited to this. Vehicle-mounted sensors other than the vehicle-mounted sensor 10 (radar apparatuses which employ radio waves (for example, millimeter-wave radar apparatuses)), or ultrasonic sensors used as corner sensors, image sensors, etc. may be adopted.

The above-described embodiment and each of the modifications thereof may be appropriately combined.

A vehicle-mounted sensor cleaning device according to an aspect of the present disclosure cleans the sensing surface of a vehicle-mounted sensor. The vehicle-mounted sensor cleaning device includes a gas nozzle that sprays a gas toward the sensing surface, a gas supply device that supplies the gas to the gas nozzle, and a control section that controls operation of the gas supply device. A predetermined value is set in the control section, for indicating an abnormal state of detection accuracy of the vehicle-mounted sensor based on detection accuracy information of an object which is obtained from the vehicle-mounted sensor. A gas supply threshold value is also set in the control section, for use in operating the gas supply device to direct a supply of the gas toward the sensing surface before the detection accuracy information becomes equal to or lower than the predetermined value. If the detection accuracy information has become lower than the gas supply threshold value, the control section operates the gas supply device.

According to the above aspect, a predetermined value is set in the control section, for indicating, based on the detection accuracy information, that the detection accuracy of the vehicle-mounted sensor is in an abnormal state, and a gas supply threshold value is set in the control section, for use in operating the gas supply device before the detection accuracy information becomes equal to or lower than the predetermined value. If the detection accuracy information has become lower than the gas supply threshold value, the gas supply device is operated and the gas is sprayed from the gas nozzle toward the sensing surface. In that way, the state of the sensing surface can be maintained in an appropriate state, by operating the gas supply device to spray the gas toward the sensing surface before the sensing surface reaches an abnormal condition. Furthermore, by making the sprayed fluid a gas, obstruction of the sensing by a liquid such as a washer liquid can be avoided.

What is claimed is:

1. A vehicle-mounted sensor cleaning device that cleans a sensing surface of a vehicle-mounted sensor, comprising:
a gas nozzle that sprays a gas toward the sensing surface;
a gas supply device that supplies the gas to the gas nozzle; and
a control section that controls operation of the gas supply device,
wherein:
the control section is configured to:
receive, from the vehicle-mounted sensor, a value of an object detection accuracy of the vehicle-mounted sensor;
determine whether the value of the object detection accuracy is higher than a first threshold value, the first threshold value being predetermined and used for determination of whether the object detection accuracy is in an abnormal state, wherein a value of the object detection accuracy less than the first threshold value indicates that the object detection accuracy is in the abnormal state;
determine whether the value of the object detection accuracy is lower than a second threshold value, the second threshold value being a first predetermined threshold for operating the gas supply device, the second threshold value being higher than the first threshold value;
determine whether the value of the object detection accuracy is lower than a third threshold value, the third threshold value being a second predetermined threshold for operating the gas supply device, the third threshold value being higher than the first threshold value and the second threshold value;
setting a cleaning completion flag, a count value of the cleaning completion flag representing the number of gas cleaning of the sensing surface of the vehicle-mounted sensor having been performed;
control the gas supply device to operate the gas supply device upon determining that the value of the object detection accuracy is lower than the second threshold value and higher than the first threshold value when the count value of the cleaning completion flag is 0; and
control the gas supply device to operate the gas supply device upon determining that the value of the object detection accuracy is lower than the third threshold value when the count value of the cleaning completion flag is greater than 0,
wherein
for a state in which the value of the object detection accuracy is lower than the second threshold value and higher than the first threshold value, only the gas from the gas supply device is sprayed toward the sensing surface.

2. The vehicle-mounted sensor cleaning device according to claim 1, wherein the control section continues operating the gas supply device until value of the object detection accuracy becomes equal to or higher than the second threshold value.

3. The vehicle-mounted sensor cleaning device according to claim 1, further comprising:
a liquid nozzle that sprays a liquid toward the sensing surface; and
a liquid supply device that supplies the liquid to the liquid nozzle,
wherein
the control section is configured to:
control the gas supply device to operate the gas supply device for a predetermined time period upon determining that the value of the object detection accuracy has changed from being higher than the first threshold value to being lower than or equal to the first threshold value;
determine whether the value of the object detection accuracy has changed from being lower than or equal to the first threshold value to being higher than the first threshold value after operating the gas supply device for the predetermined time period; and
control the liquid supply device to operate the liquid supply device upon determining that the value of the object detection accuracy has continued to be lower than or equal to the first threshold value after operating the gas supply device for the predetermined time period.

4. The vehicle-mounted sensor cleaning device according to claim 3, wherein
the control section is configured to control the gas supply device to operate the gas supply device again after operating the liquid supply device.

5. The vehicle-mounted sensor cleaning device according to claim 3, wherein the control section is configured to repeatedly operate both the gas supply device and the liquid supply device a predetermined number of times upon determining that the value of the object detection accuracy has continued to be lower than or equal to the first threshold value.

6. The vehicle-mounted sensor cleaning device according to claim 5, further comprising a notification section that issues a notification to a user to indicate that appropriate detection of an object cannot be performed,
wherein
the control section is configured to:
determine whether the value of the object detection accuracy has changed to be higher than the first threshold value after the repeated execution of the operation of the gas supply device and the operation of the liquid supply device the predetermined number of times; and
halt the operation of the gas supply device and the operation of the liquid supply device and cause the notification section to issue the notification upon determining that the value of the object detection accuracy has been kept lower than or equal to the first threshold value after the repeated execution of the operation of the gas supply device and the operation of the liquid supply device the predetermined number of times.

7. The vehicle-mounted sensor cleaning device according to claim 1, wherein
the control section is configured to:
determine whether a period for which the value of the object detection accuracy is lower than the second threshold value while keeping higher than the first threshold value has reached a predetermined threshold period; and
control the gas supply device to halt the operation of the gas supply device upon determining that the period has reached the predetermined threshold period.

8. The vehicle-mounted sensor cleaning device according to claim 1, further comprising:
a liquid nozzle that sprays a liquid toward the sensing surface; and
a liquid supply device that supplies the liquid to the liquid nozzle,
wherein:
the gas supply device comprises an air pump; and
the control section is configured to:
control the gas supply device to increase an output of the air pump stepwise upon determining that the value of the object detection accuracy becomes lower than the first threshold value;
determine whether the value of the object detection accuracy has changed to be higher than the first threshold value after operation of the gas supply device for a predetermined time period; and
control the liquid supply device to operate the liquid supply device upon determining that the value of the object detection accuracy has been kept lower than or equal to the first threshold value after the stepwise increase in the output of the air pump.

9. A vehicle-mounted sensor cleaning device that cleans a sensing surface of a vehicle-mounted sensor, comprising:
a gas nozzle that sprays a gas toward the sensing surface;
a gas supply device that supplies the gas to the gas nozzle; and
a control section that controls operation of the gas supply device,
wherein:
the control section is configured to:
receive, from the vehicle-mounted sensor, a value of an object detection accuracy of the vehicle-mounted sensor;
determine whether the value of the object detection accuracy is higher than a first threshold value, the first threshold value being predetermined and used for determination of whether the object detection accuracy is in an abnormal state, wherein a value of the object detection accuracy less than the first threshold value indicates that the object detection accuracy is in the abnormal state;
determine whether the value of the object detection accuracy is lower than a second threshold value, the second threshold value being a first predetermined threshold for operating the gas supply device, the second threshold value being higher than the first threshold value;
determine whether the value of the object detection accuracy is lower than a third threshold value, the third threshold value being a second predetermined threshold for operating the gas supply device, the third threshold value being higher than the first threshold value and the second threshold value;
setting a count value of a cleaning completion flag to 0 when the value of the object detection accuracy is not less than the third threshold value, the count value of the cleaning completion flag representing the number of times that gas cleaning of the sensing surface of the vehicle-mounted sensor that has been performed, and incrementing the count value of the cleaning completion flag by 1 in response to performing gas cleaning of the sensing surface of the vehicle-mounted sensor;
control the gas supply device to operate the gas supply device upon determining that the value of the object detection accuracy is lower than the second threshold value and higher than the first threshold value when the count value of the cleaning completion flag is 0; and
control the gas supply device to operate the gas supply device upon determining that the value of the object detection accuracy is lower than the third threshold value when the count value of the cleaning completion flag is greater than 0,
wherein
for a state in which the value of the object detection accuracy is lower than the second threshold value and higher than the first threshold value, only the gas from the gas supply device is sprayed toward the sensing surface.

* * * * *